INVENTOR:
Gerhard Greger

Feb. 10, 1970    G. GREGER    3,494,441
AUTOMOTIVE VEHICLE
Filed April 26, 1967    2 Sheets-Sheet 2
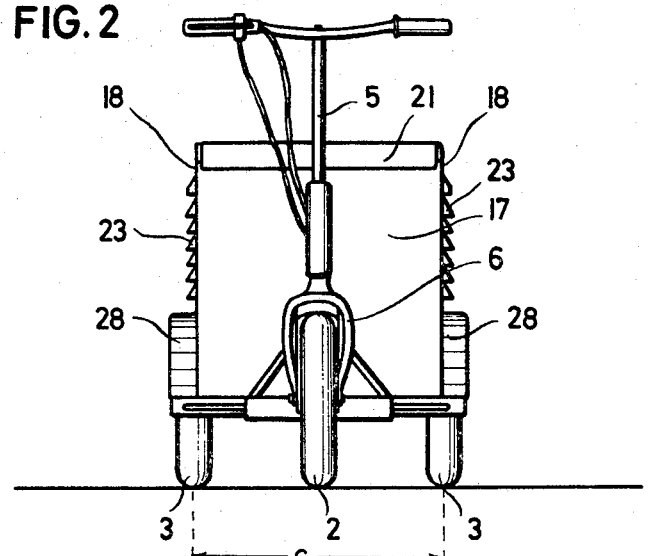
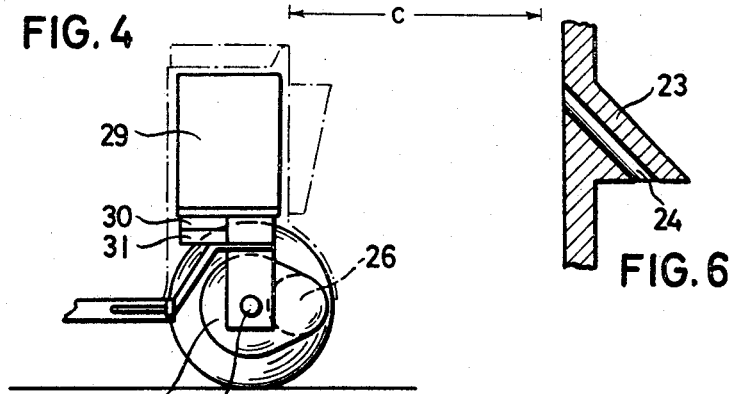
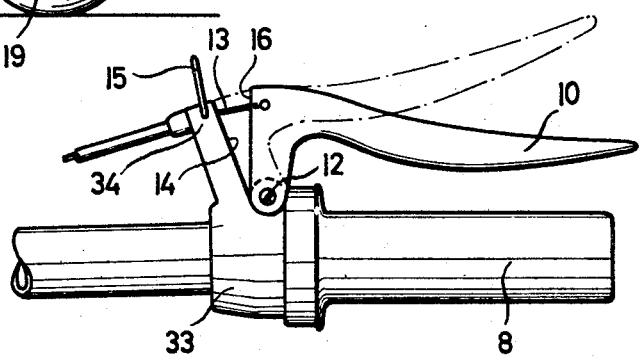
INVENTOR:
Gerhard Greger
BY

United States Patent Office 3,494,441
Patented Feb. 10, 1970

3,494,441
AUTOMOTIVE VEHICLE
Gerhard Greger, 11 Burgthanner Strasse, 8501 Ochenbruck, near Nuremberg, Germany
Filed Apr. 26, 1967, Ser. No. 635,318
Int. Cl. B60k 1/00; B62d 61/00
U.S. Cl. 180—27                                6 Claims

ABSTRACT OF THE DISCLOSURE

An automotive vehicle having a frame whose front end carries a single wheel and whose rear end carries two transversely spaced wheels. A seat is carried by the rear end upwardly spaced from the axis about which the rear wheels turn. The motive means for the vehicle, including the prime mover and a plurality of auxiliary components, is arranged within a volume of space whose maximum dimensions are determined by the distance between the rear axis and the seat on the one hand, the distance between the rear wheels on the other hand, and the longitudinal direction of the vehicle by the diameter of the rear wheel.

BACKGROUND OF THE INVENTION

The present invention relates to automotive vehicles in general, and more particularly to lightweight, small-dimensioned automotive vehicles. Still more particularly, the present invention relates to automotive vehicles of the type conventionally known as "rollers" or "scooters."

There is a widespread need for a small automotive vehicle which is lightweight, has a small overall dimension, and can be manufactured and sold very inexpensively. A vehicle of this type can be utilized as a carrier for a single passenger or for non-excessive loads in factories, housing developments, in institutions of all types such as hospitals and homes for the aged, on airfields, in supermarkets and for other applications. The range of applicability of such a vehicle already indicates the reasons for the aforementioned requirements that the vehicle be of lightweight and of compact dimensioning. Evidently, such a vehicle must be particularly agile, must require very litle storage space, must be able to go through doors and be capable of being transported in elevators, and the like. It is also necessary that the vehicle be capable of utilization by inexperienced or non-trained personnel, that it be readily servicable, and that all of its components be available for immediate and simple repair.

The vehicles of this type which are known from the prior art are not satisfactory for all of the aforementioned purposes for a variety of reasons. One of these reasons is that some of these vehicles are of the four-wheeled type which not only makes them more expensive to manufacture and sell, but also makes it more difficult for them to negotiate tight spaces and thus reduces the desired agility. Other prior-art vehicles are two wheelers which can be used only by persons who are skilled in the operation of such vehicles which requires the ability to balance the vehicle at all times and under all circumstances. Evidently, this would preclude a majority of potential users from ever availing themselves of such a vehicle under the conditions outlined in the introductory comments of this specification.

Still other prior-art vehicles have their entire motor means, namely the prime mover and the various auxiliary components of the drive, distributed throughout various parts of the vehicle, thus making the vehicle unnecessarily complicated because of the required power-train linkages and also requiring excessively bulky construction.

SUMMARY OF THE INVENTION

The present invention provides an automotive vehicle which avoids the disadvantages set forth above with respect to the prior art, and which provides in full the advantages which have been above identified as desirable.

The automotive vehicle in accordance with the present invention combines all components of its motive means in an extremely small volume of space and is thus very compact in construction.

The vehicle according to the present invention is very simple, utilizing a minimum of constituent components, and is therefore lightweight and inexpensive to manufacture and to sell.

Because of its very simplified construction the vehicle in accordance with the present invention is highly agile.

Despite the fact that the vehicle fulfills all of the above-mentioned requirements, it is readily operable even by unskilled persons, and is particularly easy to service and repair.

The latter advantage results primarily from the fact that all of the constituent components of the motive means for the vehicle are arranged together in the aforementioned very small volume of space, and further from the fact that they are accessible from all sides.

In accordance with one feature of my invention, I provide an automotive vehicle which is adapted to normally rest on a ground plane, that is the surface on which it travels. This vehicle includes an elongated frame which extends in a general plane normally parallel to the ground plane, and this frame has a front portion and a rear portion. Wheel means is carried by the frame for rotation about a front axis and a rear axis which are respectively normal to the elongation of the frame. This wheel means includes a front wheel provided on the front portion and a pair of rear wheels of given diameter which are provided on the rear portion and which are transversely spaced at a predetermined distance. A seat for the driver or operator of the vehicle is carried by the rear portion of the frame upwardly spaced from the rear axis by a given distance. Finally, my novel vehicle comprises motive means which is operatively connected with at least one of the rear wheels for turning the same. The motive means includes a prime mover and a plurality of auxiliary components which are arranged, in accordance with the invention, within a volume of space whose maximum overall dimensions in a plane normal to the general plane are determined by the given distance, and whose maximum overall dimensions in any plane parallel to the general plane are determined by the predetermined distance of the rear wheels seen in a first direction and by the given diameter of the rear wheels seen in a second direction normal to the first direction.

In accordance with the invention the motive means is enclosed by a housing which is preferably of one-piece construction and can be completely removed from the vehicle so as to make all components of the motive means totally accessible from all sides. The housing may be of various materials, including metal, but is preferably made from a lightweight plastic material. It may be made by casting, by pressing, stamping, or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a front-view of the vehicle shown in FIG. 1;

FIGS. 4–6 are detail views illustrating specific details of the vehicle shown in FIGS. 1–3.

DESCRIPTION OF THE PREFERRED EMBODIMENTS

Figure 1:
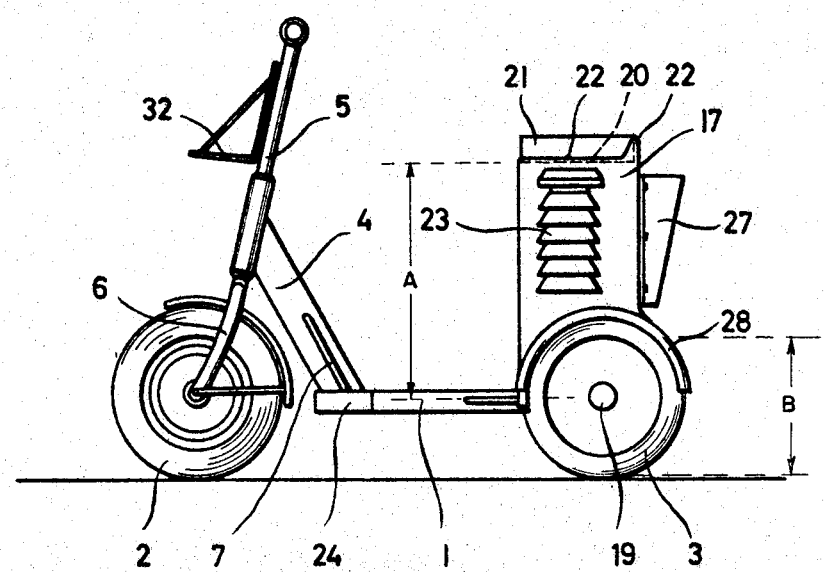
FIG. 1 is a side-elevational view of the vehicle in accordance with the present invention in one embodiment.
Figure 3:
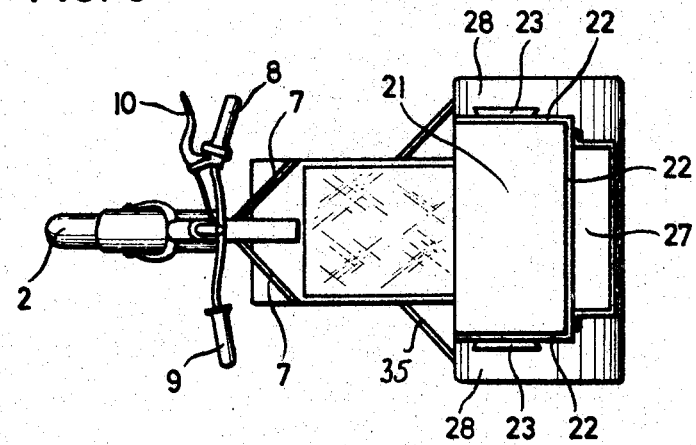
FIG. 3 is a top-plan view of the vehicle shown in FIGS. 1 and 2.

Discussing now the drawing in detail, and firstly FIGS. 1–3 thereof, it will be seen that the vehicle in accordance with the present invention comprises a frame or platform which is generally indicated with reference numeral 1. The front end of the frame has secured thereto a front wheel 2 in a manner still to be discussed. The rear end of the frame 1 has secured thereto a pair of rear wheels identified with reference numeral 3, as is most clearly evident from FIG. 2. In accordance with the invention, I prefer to use small balloon-type wheels having a diameter of approximately 300–350 mm.

FIGS. 1 and 3 show that the frame 1 is of substantially rectangular configuration and is provided at its front end with a forwardly and upwardly inclined reinforcing member 4 whose upper free end turnably carries a handlebar of conventional construction and of the type used on lightweight two-wheeled vehicles, such as bicycles or motorcycles. The handlebars are identified with reference numeral 5 and carries the bifurcated member 6 on which the front wheel 2 is rotatably secured. The rear wheels 3 are connected with the rear portion of frame 1 by means of suitable bearings in any well-known manner which is neither described nor illustrated herein because it does not constitute part of the invention. Auxiliary reinforcing members 7 connect the reinforcing member 4 with the frame 1 to provide the necessary rigidity.

The upper portion of the handlebar 5 is provided with a pair of handles identified with reference numerals 8 and 9, respectively. One of these, in the illustrated embodiment the one on the right-hand side identified with reference numeral 8, is turnable in the manner in which this is known from conventional motorcycles for regulating the admission of combustible fluid to the combustion engine of such motorcycles. If the prime mover used in the vehicle according to the present invention is a combustion engine, then the turnable handle 8 can be utilized for the same purpose as just discussed above. If, however, the prime mover is an electrically operated motor, as is preferred, then rotation of the handle 8 can activate and deactivate two or more resistances of different values so that the vehicle can be operated at two or more precisely predetermined speeds. Transmission of the rotary movement to the switching elements, which latter will be discussed subsequently, is accomplished by means of a suitable linkage, for instance the type known as "Bowden" linkage. Handle 8 is connected with a turnable handle portion 33 having a projection provided with an abutment face 14. Connected to the portion 33 is a hand grip 10 (see FIGS. 3 and 5) which is turnable about a screw or pin 12 which also serves to secure it to the handle portion 33. FIG. 5 shows in dot-dash lines that the handle 10 in its rest position abuts with an abutment face 16 against the abutment face 14 of the projection provided on the handle portion 33, following the urging of the Bowden linkage whose cable or rope 13 is connected to the hand grip 10 and extends through a bore or recess 34 in the projection of handle portion 33. It will be understood, of course, that the Bowden linkage is connected with suitable brakes which, in accordance with the invention, are disk brakes provided on the rear wheels 3 of the vehicle. Evidently, when the vehicle is to be braked to a partial or complete stop, the hand grip 10 is displaced from the dot-dash line position to the solid-line position shown in FIG. 5. If the vehicle is to be left in braked position, for instance if the operator temporarily leaves the vehicle, it is necessary to arrest the hand grip 10 in the braking position thereof. To this end a member 15, which may be a wire link or the like, is turnably secured to the projecting portion of the handle portion 33, as indicated in FIG. 5, and can be interposed in the gap between the abutment faces 14 and 16 when the hand grip 10 is in the full-line position shown in FIG. 5. If desired, the abutment face 16 of hand grip 10 can be provided with notches or the like for more positively retaining the member 15 in the arresting position thereof. Similarly, a spring or a spring arrangement (which is not illustrated) can be provided for urging the member 15 either to the position shown in FIG. 5 or to its arresting position in which it is located between the abutment faces 14 and 16.

As already indicated earlier, the entire motive means for the novel vehicle are arranged together in a rather small volume of space. Such motive means may comprise a combustion engine, a fuel tank, a transmission, a starter, a differential, and the like, or in a preferred embodiment utilizing an electromotor, they may comprise an electromotor, a battery or batteries, suitable resistances, an overload safety relay, a step-type drive switch, and a differential. Regardless of which motive means is chosen, however, it is located within a housing identified generally with reference numeral 17 which carries at its upper end a seat identified generally with reference numeral 21 and which may consists of a cushion or the like on which the passenger, that is the vehicle operator, can sit. The vertical walls of the housing 17 bound a volume of space which at the sides of the housing is bounded by the side walls which are located within the lateral portions 18 of the seat 21, and by the front walls which are located within a range bounded by the diameter of the rear wheels 3. The height of housing 17 is bounded by the rear axle 19 on which the rear wheels 3 are carried and by the underside of the cushion 21 which, as is plainly evident from FIG. 1, is supported on the upper face 20 of the housing 17. To avoid undesired shifting of the cushion 21 the upper face 20 is bounded at least at the rear thereof and over portions of the sides thereof by an upwardly extending rim 22.

In accordance with the invention, the housing 17 is preferably of one-piece construction and is so secured to the frame 1 (in a known manner and therefore not illustrated) that it can be completely removed from the frame 1 so that the entire motive means of whatever type is accessible for servicing and repair.

The lateral walls of housing 17 are provided, as evident from FIGS. 1–3, with heat-exchanging ribs 23. The particular preferred configuration of these ribs 23 is evident from FIG. 6 where it will be seen that, when the housing 17 is cast or pressed, it is provided with outwardly extending projections 23 of triangular cross-section which are subsequently provided with one or more channels 24. This construction is simpler and more advantageous than the customary shell-shaped stamping usually utilized for providing the necessary openings.

In accordance with the invention I have found it advantageous that the center of gravity of the motive means contained in the housing 17 be located somewhat forwardly of the rear axle 19. To further stabilize the entire vehicle, it is also advantageous to provide a counterweight 24 at the front end of the frame 1. This is particularly advantageous for counterbalancing the vehicle when the same is driven in reverse.

FIG. 4 shows in various schematic form that the motive means utilized in one embodiment of the invention can comprise a differential 25 to which the electromotor 26 can be secured. Furthermore, the power supply, such as a battery or accumulator, is indicated with reference numeral 29, the stepping-type resistances are indicated with reference numeral 30, and the stepping switch is identified with reference numeral 31. It will be seen that these all are located within the confines of the housing 17 which in FIG. 4 is indicated in dot-dash lines. The housing 17 is particularly light if it is made from a suitable lightweight plastic material, thus facilitating handling of the vehicle and servicing in particular of the motive-means components, inasmuch as the housing 17 is thus readily removable by a single person.

In the illustrated embodiment, the housing 17 is, as clearly evident from the various figures, of substantially rectangular cross section, which corresponds to the outline of the seat cushion 21 and which is provided at its lower end with the mud guards 28 for the rear wheels which are unitary as is evident from FIGURES 3 and 4.

To facilitate carrying of small loads on the vehicle 1, the latter is provided with a receptacle 27 which is preferably secured to a rear wall of the housing 17, as illustrated in FIGS. 1 and 3 and which may be dimensioned for a specific purpose in keeping with the particular application of the vehicle, for instance, if the vehicle is used to transport files from one place to another, the receptacle 27 can be dimensioned so as to accept files of a given configuration. Of course, this is only by way of example and no such limitations need be imposed on the configuration of the receptacle which can be dimensioned as an all-purpose carrier. Also, the handlebar 5 can be provided with a carrier 32, on which for instance bottles, boxes or other articles can be carried.

It will also be evident that either one or both of the rear wheels 3 can be driven and that, if only one of the rear wheels 3 is to be driven by the motive means, the differential 25 will not be necessary.

It will also be understood that it is, however, essential in accordance with the present invention that the motive means be grouped in the manner indicated in the various figures of the drawing, so that it is arranged within a volume of space whose maximum overall dimensions in a plane normal to the general plane of the frame 1 are determined by the distance A between the axle 19 and the face 20 on housing 17, and in any plane parallel to the general plane of the frame 1 are determined by the distance C between the wheels 3 on the one hand and by the diameter B of the wheels 3 on the other hand. This makes possible the particularly compact arrangement of the vehicle, and also permits ready and very efficient access to all components of the motive means for servicing and repair. It should also be noted, as evident from FIG. 3, that a pair of guard bars or rails 35 are provided on opposite sides of the frame 1, each of them extending from one of the mud guards 28 forwardly inclined to the frame 1. These bars 35 are provided so as to deflect the legs of a person riding on the vehicle away from contact with the wheels 3 to prevent accidents.

It will be understood that each of the elements described above, or two or more together, may also find a useful application in other types of other types of vehicles differing from the types described above.

What is claimed as new and desired to be protected by Letters Patent is set forth in the appended claims:

1. An automotive vehicle adapted to normally rest on a ground plane, comprising, in combination, an elongated frame extending in a general plane normally parallel to said ground plane, and having a front portion and a rear portion; steerable means including a front wheel means rotatable about a front axis and located adjacent to said front portion of said elongated frame; means turnably securing said steerable means to said front portion of said elongated frame; a pair of rear wheels of given diameter rotatably mounted on said rear portion about a rear axis and transversely spaced at a predetermined distance; a seat carried by said rear portion located above and upwardly spaced from said rear axis by a given distance; motive means having a center of gravity located forwardly of said rear axis and rearwardly of said front axis of said vehicle and operatively connected with at least one of said rear wheels for turning the same, said motive means including a prime mover and a plurality of auxiliary components arranged within a volume of space whose maximum overall dimensions in a plane normal to said general plane are determined by said given distance, and in any plane parallel to said general plane by said predetermined distance in a first direction and by said given diameter in a second direction normal to said first direction; and counterweight means secured to said front portion of said elongated frame for stabilizing said vehicle.

2. A vehicle as defined in claim 1, and further comprising a housing surrounding said volume of space substantially coextensive therewith.

3. A vehicle as defined in claim 2; and further comprising coupling means releasably coupling said housing to said frame so that said housing may be completely separated from said frame for obtaining unobstructed access to said motive means.

4. A vehicle as defined in claim 2, wherein said housing consists of a synthetic plastic material.

5. A vehicle as defined in claim 2, wherein said housing is provided with a plurality of outwardly projecting portions of polygonal cross section and each provided with an air passage communicating with the interior and the exterior of said housing.

6. A vehicle as defined in claim 2; and further comprising at least one receptacle for carrying a load.

References Cited

UNITED STATES PATENTS

| | | | |
|---|---|---|---|
| 2,207,447 | 7/1940 | Viles et al. | 180—27 |
| 2,445,058 | 7/1948 | Fields | 180—77 |
| 2,973,048 | 2/1961 | Jensen | 180—65 X |
| 2,973,220 | 2/1961 | White. | |
| 3,059,713 | 10/1962 | Beggs | 180—65 X |
| 3,073,404 | 1/1963 | Hudson | 180—27 |
| 3,150,735 | 9/1964 | Kaufman | 180—65 X |
| 3,330,371 | 7/1967 | Seaman | 180—27 X |
| 3,369,629 | 2/1968 | Weiss | 180—27 |

FOREIGN PATENTS 630,496 10/1949 Great Britain.

A. HARRY LEVY, Primary Examiner

U.S. Cl. X.R.

180—65